Feb. 8, 1966  A. EBERHARDT  3,233,514
CONTROL MECHANISM FOR VARIFOCAL OBJECTIVE AND THE LIKE
Filed Feb. 20, 1963

ANTON EBERHARDT
Inventor:

BY Karl G. Ross
AGENT

# United States Patent Office 3,233,514
Patented Feb. 8, 1966

3,233,514
CONTROL MECHANISM FOR VARIFOCAL OBJECTIVE AND THE LIKE
Anton Eberhardt, Kreuznach, Rhineland, Germany, assignor to Jos. Schneider & Co., Optische Werke, Bad Kreuznach, Rhineland, Germany, a corporation of Germany
Filed Feb. 20, 1963, Ser. No. 259,892
Claims priority, application Germany, Feb. 24, 1962, Sch 31,047
6 Claims. (Cl. 88—57)

My present invention relates to a control mechanism for an optical system, such as a varifocal objective, in which a plurality of optical elements (e.g. lenses) are differentially displaceable along a common axis.

The general object of this invention is to provide, in an optical system of this type, means for conveniently, and with great accuracy, displacing two or more relatively movable optical elements such as lenses at different rates, e.g. for the purpose of varying the magnification ratio and/or focal length of an objective without changing the position of its image plane.

A more specific object of the invention is to provide a control mechanism of this character which is easy to operate even with optical components of relatively large dimensions and correspondingly great weight.

It is also an object of my invention to provide means for axially displacing a pair of lens elements with the aid of a single control member, which may be manually or automatically operated, within overlapping ranges yet without mutual interference.

In accordance with a feature of this invention I provide a generally cylindrical control member which is rotatable about an axis parallel to the optical axis of the controlled system and is provided on its outer periphery with a plurality of leadscrew-type tracks, preferably a pair of such tracks including a relatively narrow screw thread or combination of screw threads of constant pitch and a relatively wide helicoidal groove of varying pitch. The two or more tracks may also be distinguished by their depth, if desired. These tracks are engaged by a corresponding number of followers rigid with respective lens mounts that carry the elements to be displaced at different rates. A convenient way of positively preventing engagement of a follower with the wrong track resides in providing one of these followers with a plurality of teeth which simultaneously engage in different turns of the constant-pitch screw thread or threads and in their totality are wider than the helicoidal groove of varying pitch so as not to fit into the latter, the follower coacting with this groove being in turn so wide as to be unable to enter any of the turns of the constant-pitch screw thread. In this manner it becomes feasible to dispose the two tracks in mutually overlapping relationship on a part of the peripheral surface of the control member so that the two differentially displaceable lens elements entrained thereby will be movable at least in part over a common path.

With the control member disposed eccentrically of the lens mounts, as described above, it is desirable to support these lens mounts for sliding motion in axial direction on a plurality of guide rods, preferably with interposition of suitable antifriction means such as linear ball bearings, to facilitate their entrainment. These same guide rods, advantageously spaced apart at 90° intervals around the optical axis of the system, may also support a further lens mount carrying another element, such as a front lens, used in a manner known per se for focusing purposes; this latter lens mount may be adjustable with the aid of a second control member which is preferably rotatable on a common supporting rod, coaxially with the control member serving the differentially displaceable lens elements of the varifocal objective or attachment.

The invention will be described in greater detail with reference to the accompanying drawing in which.

Figure 1:
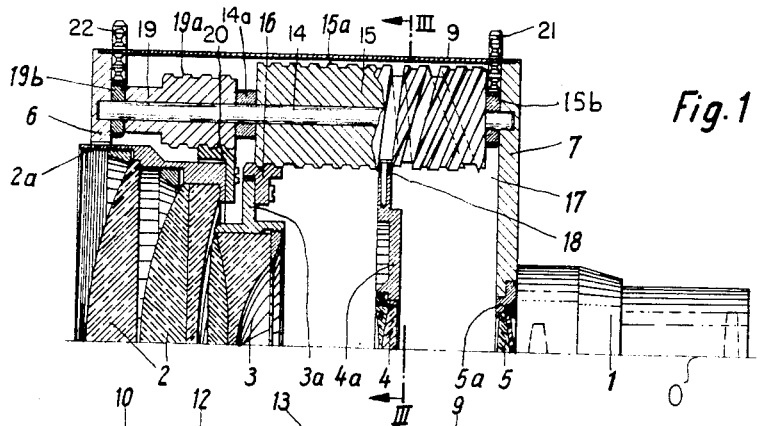
FIG. 1 is an axial sectional view of a varifocal attachment, associated with a camera objective, which embodies the principles of my invention described above, this view being taken on the line I—I of FIG. 3.
Figure 2:
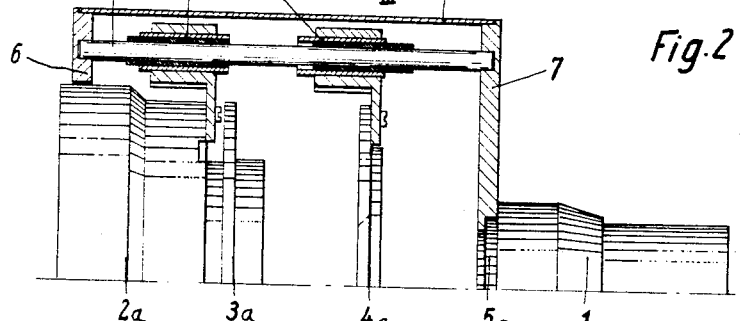
FIG. 2 is a similar sectional view taken, however, on the line II—II of FIG. 3.

The system shown in the drawing comprises a principal photographic or cinematographic objective 1, of conventional type, in tandem with a varifocal front attachment therefor, this attachment including a set of lenses which constitute four components 2, 3, 4 and 5. The components 2–5 are provided with individual lens mounts 2a, 3a, 4a and 5a, the first three lens mounts being independently movable along the optical axis O of the system whereas the lens mount 5a, carrying the rear component 5, is rigid with the back plate 7 of the attachment housing. This housing further includes a front plate 6, a prismatic peripheral wall 9 and a set of axially extending connecting rods 8 joining the two end plates 6, 7 together. Four high-precision guide rods 10, 10a, 11 and 11a traverse the housing axially and are disposed at 90° intervals along an imaginary cylindrical surface centered on the optical axis O. Lens mounts 2a and 4a are slidably supported on the diametrically opposite rods 10 and 10a by means of linear ball bearings 12 and 13, lens mount 3a being similarly supported by ball bearings 13a on the two remaining guide rods 11 and 11a.

A further rod 14, paralleling the mounting rod 8 and the guide rods 10, 10a, 11 and 11a, spans the housing end walls 6 and 7 above the lens assembly 2–5 and supports two cylindrical control members 15 and 19 for independent rotation. Members 15 and 19, separated from each other by a freely rotatable collar 14a, are rigid with two pinions 15b and 19b, respectively, which mesh with respective driving gears 21 and 22. The gears 21 and 22 project outwardly from the housing wall 9 for manual operation, yet it is to be understood that especially the gear 21 could also be powered by automatic means such as, for example, a reversing drive of the type disclosed in commonly assigned application Serial No. 132,-029, filed August 17, 1961, now U.S. Patent No. 3,165,044, by Paul Himmelsbach.

Control member 15 is formed with two peripheral tracks, namely by a set of leadscrew threads 15a of constant pitch and a helicoidal camming groove 17 of varying pitch. Complementary teeth on a track follower 16, projecting upwardly from lens mount 3a, engage in several turns of the multithread track 15a whereas another track follower 18, in the shape of a stud, enters the groove 17 for positive camming displacement thereby. It will noted that the two tracks 15a and 17 overlap in the right-hand half of member 15 (FIG. 1) and that groove 17 exceeds in both width and depth the helical grooves forming the track 15a. It will also be seen that neither of the track followers 18 and 19 is capable of cooperating with the nonassociated track.

The second control member 19 is provided with screw threads 19a, similar to threads 15a, engaged in analogous manner by a track follower 20 rigid with the lens mount 2a. Front component 2 may thus be displaced axially, for focusing purposes, independently of the position of components 3 and 4 which serve to adjust the focal length of the overall optical system 1–5.

Figure 3:
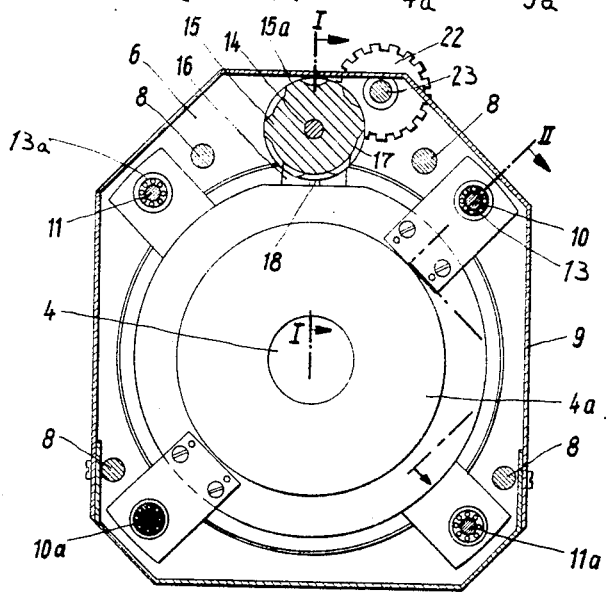
FIG. 3 is a cross-sectional view taken on the line III—III of FIG. 1.

It will be understood that the shape of groove 17 may be altered in conformity with the particular law of relative displacement for which the movable components 3 and 4 have been designed. As here shown by way of example, groove 17 is so shaped that lens mount 14a will move toward rear plate 7 at an increasing rate upon counterclockwise rotation of member 15 (as viewed in FIG. 3) while the pitch of screw threads 15a has been so selected that lens mount 4 will move rearwardly at a faster average speed than lens mount 4a.

My invention is, of course, not limited to the specific details of construction described and illustrated but may be modified in various ways without departing from the spirit and scope of the appended claims.

I claim:

1. A control mechanism for the differential displacement of a pair of optical elements along a common axis, comprising guide means for said elements enabling movement thereof along said axis, a generally cylindrical control member rotatable about its axis, said member having generatrices parallel to said common axis and being provided on a peripheral surface with at least one relatively narrow groove forming a leadscrew track of constant pitch and a relatively wide groove forming a leadscrew track of varying pitch overlapping each other on a part of said surface, first follower means on one of said elements matingly engaging in a plurality of turns of said track of constant pitch, second follower means on the other of said elements matingly engaging in said relatively wide groove, the width of said first follower means exceeding that of said relatively wide groove, and means for rotating said control member about its axis.

2. In an optical system with a pair of relatively displaceable lens elements, in combination, a housing, a pair of lens mounts in said housing respectively supporting said elements, guide means in said housing engaged by said lens mounts for enabling movement of said elements along a common optical axis, a generally cylindrical control member in said housing rotatable about its axis, said member having generatrices parallel to said optical axis and being provided on a peripheral surface with at least one relatively narrow groove forming a leadscrew track of constant pitch and a relatively wide groove forming a leadscrew track of varying pitch overlapping each other on a part of said surface, first follower means on one of said lens mounts matingly engaging in a plurality of turns of said track of constant pitch, second follower means on the other of said lens mounts matingly engaging in said relatively wide groove whereby said lens mounts are positively entrainable at different rates upon rotation of said member, the width of said first follower means exceeding that of said relatively wide groove, and means for rotating said member about its axis.

3. The combination defined in claim 2 wherein said guide means comprises a plurality of rods extending axially through said housing on different sides of said optical axis, said lens mounts being provided with antifriction bearing means coacting with said rods.

4. The combination defined in claim 3 wherein said rods are disposed 90° apart and equidistant from said optical axis.

5. The combination defined in claim 2, further comprising a second control member in said housing coaxial with the first-mentioned control member, said control members being provided with a common supporting rod axially traversing said housing, said second control member being rotatable independently of said first-mentioned control member and being provided with external screw threads, said elements including a pair of focal-length-varying lenses having their lens mounts entrainable by said tracks and a focusing lens with a further lens mount operatively engaging said screw threads.

6. The combination defined in claim 2 wherein said first follower means has teeth simultaneously engaging in said plurality of turns of said track of constant pitch, the combined width of said teeth being greater than that of said relatively wide groove.

References Cited by the Examiner

UNITED STATES PATENTS

| | | | |
|---|---|---|---|
| 1,174,547 | 3/1916 | Clason | 88—57 |
| 1,755,105 | 4/1930 | Douglass | 88—57 |
| 2,532,684 | 12/1950 | Walker | 88—57 |
| 2,984,167 | 5/1961 | Staubach | 88—57 |
| 3,028,792 | 4/1962 | Krajowsky et al. | 88—57 |

JEWELL H. PEDERSEN, *Primary Examiner.*

JOHN K. CORBIN, *Examiner.*

R. J. STERN, *Assistant Examiner.*